United States Patent [19]

Putt

[11] 4,343,868
[45] Aug. 10, 1982

[54] HYDROGEN ION-PRODUCING CELL AND TECHNIQUE FOR CONTROLLING THE PH OF BATTERY ELECTROLYTES

[75] Inventor: Ronald A. Putt, Palatine, Ill.

[73] Assignee: Electric Power Research Institute, Inc., Palo Alto, Calif.

[21] Appl. No.: 221,932

[22] Filed: Dec. 31, 1980

[51] Int. Cl.³ .................... H01M 8/06; H01M 10/36
[52] U.S. Cl. ........................................ 429/17; 429/19; 429/105
[58] Field of Search .............. 429/17, 19, 50, 51, 429/101, 105, 21, 13, 22, 106, 107, 61, 63

[56] References Cited

U.S. PATENT DOCUMENTS

| | | | |
|---|---|---|---|
| 3,238,066 | 3/1966 | Klass et al. | 429/13 |
| 3,378,403 | 4/1968 | Waubke et al. | 429/22 |
| 3,470,026 | 9/1969 | Juda et al. | 429/13 |
| 3,825,445 | 7/1974 | MacCarthy | 429/107 |
| 4,144,381 | 3/1979 | Fatica | 429/105 |
| 4,146,680 | 3/1979 | Carr et al. | 429/51 |
| 4,206,269 | 6/1980 | Putt et al. | 429/105 |

Primary Examiner—Donald L. Walton
Attorney, Agent, or Firm—Flehr, Hohbach, Test, Albritton & Herbert

[57] ABSTRACT

The metal-halogen battery disclosed herein, specifically zinc-bromine, is one in which hydrogen ions are lost from its electrolyte solution during operation, thereby resulting in an undesirable increase in the pH of this solution. However, an arrangement is disclosed herein for replacing the lost hydrogen ions and thereby maintaining the pH of its electrolyte solution at a desirable level. In a preferred embodiment, this arrangement comprises an electrolysis cell which serves to oxidize water for producing the needed hydrogen ions.

8 Claims, 1 Drawing Figure

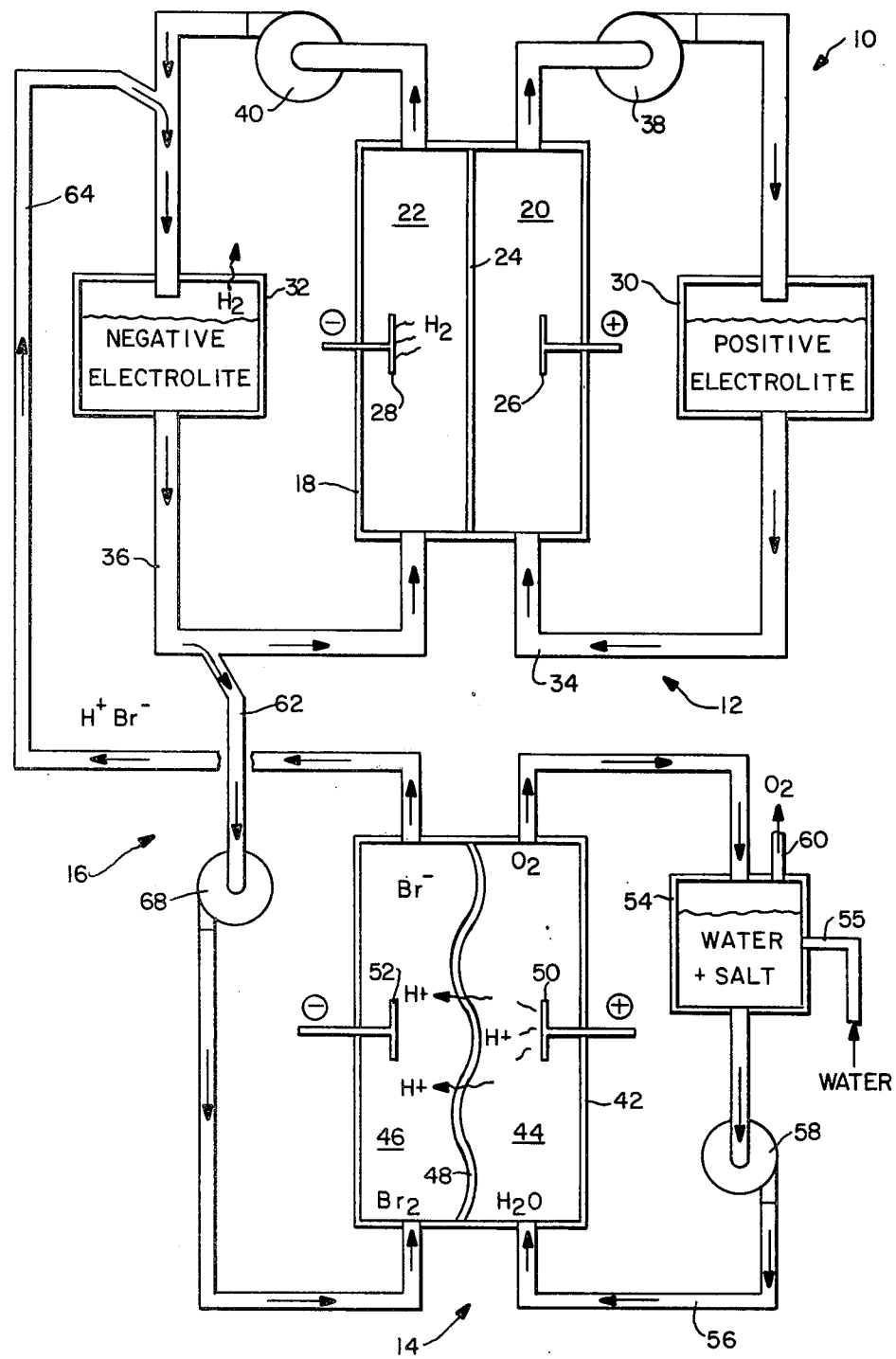
FIG.—1

HYDROGEN ION-PRODUCING CELL AND TECHNIQUE FOR CONTROLLING THE PH OF BATTERY ELECTROLYTES

The present invention relates generally to metal-halogen or like batteries in which hydrogen ions are lost from its electrolyte solution during operation and more particularly to a technique for replacing the lost ions so as to maintain the pH of its electrolyte solution at a desirable level.

One electrochemical system which requires pH control is the zinc-bromine battery. This particular battery is one in which hydrogen gas is evolved as a side reaction at its negative electrode, as in many batteries having an aqueous electrolyte. In the case of the zinc-bromine battery and others which employ zinc as the negative electrode, the rate of this "gassing" is very low, owing to the poor kinetics of hydrogen ion reduction on zinc and the low hydrogen ion concentration generally provided (a typical pH of 2). Nevertheless, some hydrogen ions are lost in these batteries, thereby resulting in a slow increase in the pH of the electrolyte. Over several cycles of battery operation the loss of hydrogen ions will cause the pH to rise from 2 to 4, at which point the pH must be reduced. Otherwise, zinc deposition during battery charging becomes undesirably mossy and the risk is run of precipitating zinc hydroxide which is capable of plugging various flow channels in the closed electrolyte system of the battery.

In small laboratory test cells of the general type described, the pH can be lowered by adding a few milliliters of hydrobromic acid or other suitable acid when necessary. However, as the battery size increases, the quantities of acid required increase and, in the case of zinc-bromine batteries, large additions of hydrobromic acid cause the bromide ion concentrations to increase to unacceptable levels. In addition, the addition of any acid would certainly not be practical for a utility storage battery which is expected to operate for years with little or no maintenance.

Another possible solution is to slow down the rate of pH rise in the battery's electrolyte by sealing its housing and specifically its negative electrolyte reservoir in the case of a closed zinc-bromine system. In this way, the hydrogen gas which evolves from the electrolyte at the negative electrode is trapped and will thus recombine with the bromine present in the solution. This recombination can be enhanced by photo-catalysis (by employing ultra-violet light) or by means of electro-catalysis in which a recombination electrode is used. However, some hydrogen will inevitably be lost as a result of leakage and permeation through the containment material of the battery even if much of the evolved hydrogen gas is recombined, thereby resulting in a pH increase.

In view of the foregoing, a primary object of the present invention is to provide a technique for controlling the pH of the aqueous electrolyte solution in a battery of the type described and specifically a technique in which the pH is prevented from rising to an undesirably high value.

Another primary object of the present invention is to prevent the aqueous electrolyte solution from increasing to an undesirably high level by replacing hydrogen ions in the solution for those which are lost through gassing.

A more particular object of the present invention is to provide a reliable and yet uncomplicated and safe technique for adding hydrogen ions to an electrolyte solution in batteries of the type described and specifically in a closed zinc-bromine battery.

Another particular object of the present invention is to provide a technique of the type just recited in which an electrolysis cell or the like is employed for electrochemically adding hydrogen ions by decomposing water, thereby eliminating the need for using acid which is difficult to handle or pure hydrogen gas, which is one way of introducing the needed hydrogen ions but which is also dangerous to handle and requires periodic replacement of hydrogen cylinders.

As will be described in more detail below, the battery disclosed herein is one in which hydrogen ions are produced in and lost from its aqueous electrolyte solution during operation. In the specific embodiment disclosed, a zinc-bromine battery containing a closed negative electrolyte system is combined with an electrolysis cell in which hydrogen ions are produced from the decomposition of water. More specifically, a portion of the battery's continuously flowing stream of negative electrolyte is first diverted into and through the electrolysis cell where it collects newly produced hydrogen ions and thereafter back into the main electrolyte stream. A more detailed description of this technique and the overall battery assembly disclosed herein will be described below in conjunction with sole FIGURE 1 which diagrammatically illustrates the assembly in accordance with the present invention.

BRIEF DESCRIPTION OF THE DRAWING

FIG. 1 is a diagrammatic illustration of the assembly in accordance with the invention.

Turning specifically to FIG. 1, the overall battery assembly shown there is generally designated by the reference numeral 10. This assembly may be divided into three functional components, a zinc-bromine battery 12, an electrolysis cell 14 and means generally indicated at 16 for coupling the battery and electrolysis cell together in a way which introduces the hydrogen ions produced by cell 14 into the electrolyte solution of battery 12 as will be described in more detail hereinafter. In this way, the pH of the electrolyte solution can be controlled, as will also be described in more detail hereinafter.

The zinc-bromine battery itself, that is, apart from the overall assembly, is or may be conventional. The particular battery illustrated in FIG. 1 at 12 includes a main housing 18 which contains two inner compartments or chambers, a positive chamber 20 and a negative chamber 22, located on opposite sides of an appropriate separator 24. A positive electrode 26 constructed of suitable, standard material is fixedly maintained within chamber 20 and a negative electrode 28 constructed of suitable, standard material, for example zinc, is fixedly maintained in chamber 22. While illustrated only diagrammatically, these two electrodes are respectively connected to positive and negative terminals located outside or forming part of housing 18.

Zinc-bromine battery 10 also includes separate supplies of positive and negative electrolyte solution contained within their own housings 30 and 32, respectively. The particular solutions may be readily provided. For example, the positive electrolyte is an aqueous solution having a specific bromine concentration and the negative electrolyte is an aqueous solution containing a substantially lesser concentration of bromine. The two reservoirs 30 and 32 of electrolyte solution are placed in fluid communication with positive and negative chambers 20 and 22, respectively, by suitable tubing generally indicated at 34 and 36. Tubing 34 which defines a closed loop path between the reservoir of positive electrolyte and chamber 20 combines with a suitable pump 38 for providing a continuous flow of positive electrolyte along its closed loop path through the positive chamber. In a similar manner, tubing 36 which defines its own closed loop path between the supply of negative electrolyte and chamber 22 cooperates with a second suitable pump 40 for providing a continuous stream of negative electrolyte through negative chamber 22. As the electrolyte solutions pass through their respective chambers, the appropriate electrochemical reactions take place in order to cause the battery to operate in the intended manner. As these reactions take place, some hydrogen ions are lost from the negative electrolyte solution in the form of hydrogen gas which, as stated previously, evolves at the negative electrode. As also stated previously, at least some of this hydrogen gas is permanently lost and, if not replaced, causes the electrolyte's pH to increase. However, as will be seen below, electrolysis cell 14 serves to replace these lost ions.

Referring specifically to the electrolysis cell, it can be seen that the latter also includes its own housing 42 having a positive internal chamber section 44 and a negative internal chamber section 46. These two chamber sections are separated by a cation-exchange membrane 48 which is designed to pass ions, specifically hydrogen ions, but not liquids or oxygen gas. One such membrane is made available by the DuPont Company under the tradename NAFION.

As illustrated in FIG. 1, the positive electrode 50 which is adapted for connection to the positive side of an external power supply (not shown) is fixedly maintained within chamber section 44 and a negative electrode 52 which is adapted for connection to the negative side of the power supply is fixedly contained within chamber section 46. A separate supply of water containing salts, for example zinc sulfate serving as an electrolyte to support electrolysis, is maintained in still a separate container or housing 54 which is continuously replenished with water, as generally indicated at 55 in FIG. 1. In this regard, once the necessary amount of salt (which can be readily determined) is provided within container 54, it is only necessary to add water for replenishing the supply.

Container 54 is placed in fluid communication with chamber 44 by means of suitable tubing generally indicated at 56. This latter tubing which defines a closed loop path between the water supply and chamber section 44 combines with a suitable pump 58 for providing a continuous stream of the salt water through chamber 44 and across electrode 50 where the latter causes the water to oxidize within chamber section 44 and thereby produce hydrogen ions and oxygen gas. Since the oxygen cannot pass through membrane 48, it is carried with the continuous stream of water back into container 54 and is vented thereafter into the ambient surroundings by suitable venting means generally indicated at 60. At the same time, the hydrogen ions produced in chamber section 44 do pass through membrane 48 and into chamber section 46. The electrochemical reaction which actually takes place in the positive chamber section may be written as follows:

$$H_2O \rightarrow 4H^+ + O_2\uparrow + 4e \qquad (EQ. 1)$$

After the hydrogen ions produced in chamber section 44 of electrolysis cell 14 pass into chamber section 46, they are introduced into the negative stream of electrolyte solution comprising part of battery 10 by means of coupling network 16. As seen in FIG. 1, this network includes a first bypass tube 62 extending between tubing 36 on one side of the negative electrolyte supply and chamber 46 in cell 14 and a second bypass tube 64 extending between tubing 36 on the opposite side of the negative electrolyte supply and chamber 46. These two bypass tubes in conjunction with still another suitable pump 68 which also forms part of the overall coupling network serve to divert a portion of the negative electrolyte solution from battery 10 along its own path through negative chamber section 46 of the electrolysis cell and back into the main electrolyte stream. This results in the following reaction at electrode 52:

$$Br_2 + 2e^- \rightarrow 2Br^- \qquad (EQ. 2)$$

It should be noted that the electrolyte solution intended for passage through the electrolysis cell is first diverted from the main stream before the latter passes into chamber 22 and the diverted electrolyte leaving chamber section 46 is returned to the main electrolyte path after the latter has passed through chamber 22. In this way, as the diverted stream of electrolyte passes through chamber section 46 it collects the hydrogen ions present therein and delivers these ions to the negative electrolyte supply for replenishing those lost by the evolving gas in battery chamber 22. The exact number of hydrogen ions which are introduced into the diverted stream will depend upon the amount of electrolysis which takes place which is dependent upon the design of the cell. This in turn will be determined by the anticipated amount of hydrogen gas lost so as to maintain the pH of the overall negative electrolyte solution at the desired level.

From the foregoing it should be apparent that the overall reaction which takes place in electrolysis cell 14 may be written as follows:

$$2H_2O + 2Br_2 \rightarrow 4HBr + O_2 \qquad (EQ. 3)$$

As can be seen from the latter reaction, the hydrogen ions in chamber section 46 combine with the bromine ions in the negative electrolyte to produce hydrogen bromide along with the previously recited oxygen gas. In this way, cell 14 not only supplies the needed hydrogen ions to control the pH of the negative electrolyte solution in battery 10 but also prevents the bromine in the solution from increasing to an undesirably high level by first reducing it as seen in EQ. 2 and thereafter combining it with free hydrogen ions as seen in EQ. 3.

While the overall technique just described is especially suitable for use with zinc-bromine batteries, it is to be understood that this technique is equally applicable for use with metal-halogen batteries generally. It may also be suitable with other types of hydrogen ion producing batteries in which at least some of the ions are lost and must be replaced. In addition, while the most advantageous way of replenishing the lost hydrogen ions is by the technique described utilizing an electrolysis cell, other means may be provided for electrochemically adding hydrogen ions by decomposing water. Moreover, hydrogen ions could be introduced into the negative electrolyte system of battery 10 by for example adding hydrogen gas directly therein. However, as stated previously, this requires that the hydrogen supply itself be continuously replenished. Also hydrogen gas is relatively difficult and possibly hazardous to handle, especially when contrasted with water.

What is claimed is:

1. In a battery assembly of the type including a battery in which hydrogen ions are present in and lost from its electrolyte solution during operation, an arrangement for replacing at least some of said lost ions, said arrangement comprising means for providing a supply of hydrogen ions independent of those present in or lost from said solution, and means for introducing hydrogen ions from said supply into said electrolyte solution, said supply means including electrolysis cell means for decomposing water so as to contain a supply of hydrogen gas outside said battery, said gas serving to provide said hydrogen ions, said electrolysis cell means including its own housing having an internal chamber, means for providing a continuously flowing supply of water through said chamber and means for oxidizing said water in said chamber whereby to form said supply of hydrogen ions and oxygen gas, and wherein said means for introducing hydrogen ions includes means cooperating with said battery for directing at least a portion of the electrolyte solution in the latter through the chamber of said cell means and thereafter back into said battery whereby to add the hydrogen in said chamber to said solution.

2. An arrangement according to claim 1 wherein said electrolysis cell means includes a cation-exchange membrane impervious to said oxygen but not hydrogen ions for separating said chamber into a positive chamber side for receiving said supply of water and a negative chamber side for receiving said electrolyte solution and positive and negative electrodes respectively located therein, said positive electrode serving to oxidize said water and said negative electrode serving to draw the hydrogen ions in said positive chamber side through said membrane and into said negative chamber side, said cell means including means cooperating with said positive chamber side for venting the oxygen produced therein to the ambient surroundings.

3. An arrangement according to claim 1 wherein said battery is a zinc-bromine battery in which its electrolyte solution contains bromine and wherein said hydrogen ion introducing means includes means for combining the introduced hydrogen ions with available bromine in said solution to form hydrogen bromide therein.

4. A battery assembly comprising: a metal-halogen battery including an overall housing having positive and negative inner chambers and electrodes fixedly supported therein, means for providing a continuous flow of positive aqueous electrolyte containing a halogen along a positive electrolyte path through said positive inner chamber and means for providing a continuous flow of negative aqueous electrolyte containing a halogen along a negative electrolyte path through said negative inner chamber, during which and as a result thereof hydrogen gas is produced within said negative chamber and at least in part lost to the ambient surroundings; and an arrangement for replacing at least some of said lost ions, said arrangement including an electrolysis cell separate from and located outside said metal-halogen battery, said cell including its own housing having a positive internal chamber section and electrode fixedly disposed therein and a negative internal chamber section and electrode fixedly disposed therein, a cation-exchange membrane impervious to water and oxygen but not hydrogen ions separating said chamber sections from one another, and means for providing a continuously flowing supply of water through said positive chamber section so as to cause the latter to be oxidized therein by said positive electrode to form hydrogen ions and oxygen gas, said hydrogen ions being attracted to the negative electrode in said negative chamber section, thereby causing said ions to migrate through said membrane to said negative chamber section, said arrangement also including means cooperating with said metal-halogen battery for diverting a portion of said flow of negative electrolyte from said positive electrolyte path through the negative chamber section of said cell for collecting hydrogen ions therein and back into said last-mentioned path.

5. An assembly according to claim 4 wherein said halogen is bromine and wherein said collected hydrogen ions combine with bromine in said negative electrolyte as hydrogen bromide.

6. In a battery assembly of the type including a battery in which hydrogen ions are present in and lost from its electrolyte solution during operation, a method for replacing at least some of said lost ions, said method comprising the steps of providing a supply of hydrogen ions independent of those present in or lost from said solution by electrochemically decomposing water in a cell separate from said battery to produce hydrogen gas, and introducing hydrogen ions in the form of said hydrogen gas from said supply into said electrolyte solution.

7. A method according to claim 6 wherein said hydrogen ions in the form of said hydrogen gas are introduced into said electrolyte solution by passing at least a portion of the electrolyte solution through a means which is separate from said battery and which contains said supply.

8. A method according to claim 7 wherein said battery is a metal-halogen battery.

* * * * *